(12) United States Patent
Chiu (10) Patent No.: US 7,735,876 B2
(45) Date of Patent: Jun. 15, 2010

(54) FASTENING DEVICE FOR CABLE AND WAVE HOSE

(75) Inventor: Teh-Tsung Chiu, Taipei County (TW)

(73) Assignee: AVC Industrial Corp., Taipei (TW)

( * ) Notice: Subject to any disclaimer, the term of this patent is extended or adjusted under 35 U.S.C. 154(b) by 0 days.

(21) Appl. No.: 11/968,973

(22) Filed: Jan. 3, 2008

(65) Prior Publication Data

US 2009/0174154 A1    Jul. 9, 2009

(51) Int. Cl.
    *F16L 5/08* (2006.01)
(52) U.S. Cl. .................. 285/207; 403/240; 285/243; 285/323; 174/655
(58) Field of Classification Search .............. 285/139.1, 285/151.1, 207, 208, 243, 322, 323; 174/653–655, 174/659–664; 403/240, 250, 259; 277/531, 277/607, 619, 622, 623, 644, 647
    See application file for complete search history.

(56) References Cited

U.S. PATENT DOCUMENTS

| | | | | |
|---|---|---|---|---|
| 3,424,853 A * | 1/1969 | Johnson | ...................... | 174/359 |
| 3,603,912 A * | 9/1971 | Kelly | ......................... | 439/273 |
| 4,169,967 A * | 10/1979 | Bachle | ........................ | 174/654 |
| 4,250,348 A * | 2/1981 | Kitagawa | .................... | 174/655 |
| 4,334,121 A * | 6/1982 | Kutnyak | .................... | 174/68.3 |
| 4,583,811 A * | 4/1986 | McMills | ....................... | 439/584 |
| 4,608,454 A * | 8/1986 | Lackinger | ................... | 174/653 |
| 4,692,563 A * | 9/1987 | Lackinger | ................... | 174/654 |
| 4,814,547 A * | 3/1989 | Riley et al. | ................. | 174/653 |
| 4,900,068 A * | 2/1990 | Law | ........................ | 285/139.2 |
| 5,068,496 A * | 11/1991 | Favalora | ..................... | 174/654 |
| 5,072,072 A * | 12/1991 | Bawa et al. | ................. | 174/655 |
| 5,310,963 A * | 5/1994 | Kennelly | .................... | 174/667 |
| 5,321,205 A * | 6/1994 | Bawa et al. | ................. | 174/655 |
| 5,543,582 A * | 8/1996 | Stark et al. | .................. | 174/653 |
| 5,763,833 A * | 6/1998 | Bawa et al. | ................. | 174/655 |
| 5,927,892 A * | 7/1999 | Teh-Tsung | .................. | 403/259 |
| 6,034,325 A * | 3/2000 | Nattel et al. | .................. | 174/59 |
| 6,350,955 B1* | 2/2002 | Daoud | ........................ | 174/651 |
| 6,488,318 B1* | 12/2002 | Shim | ......................... | 285/322 |
| 6,812,406 B2* | 11/2004 | Hand | ......................... | 174/667 |
| 7,431,343 B2* | 10/2008 | Chiu | ....................... | 285/151.1 |
| 7,504,582 B1* | 3/2009 | Chiu | .......................... | 285/322 |
| 2005/0077722 A1* | 4/2005 | Kiely | .............................. | 285/1 |

* cited by examiner

*Primary Examiner*—Daniel P Stodola
*Assistant Examiner*—Joshua T Kennedy
(74) *Attorney, Agent, or Firm*—Chun-Ming Shih (57) ABSTRACT

A fastening device is provided for fastening cables, fibers or wave hoses in position with multiple ways, and for waterproof capability. The fastening device includes a first casing, an inner holding part, a waterproof screw annulus, a positioning nut, a connecting casing, a second casing, an inner buckled nut, a resilient washer, and a constricting gasket. The first casing and the second casing are respectively engaged with the waterproof screw annulus and the connecting annulus. The first casing and the second casing take force to the wave hose for holding the cable or fiber in place in multiple ways, and avoid shifting or breaking off from drawing outside. The fastening device also has multi-ways for waterproof.

7 Claims, 14 Drawing Sheets

FASTENING DEVICE FOR CABLE AND WAVE HOSE

BACKGROUND

This invention relates to a fastening device, more particularly to a fastening device for fastening cable, fiber, and wave hose to board with waterproof capability.

It is important to consider connecting mean of two cable connectors when the cable passing through some interlinkage place. For example, a reciprocator in an automaton has cables for transmitting signals. The connectors of the cables will generate great abrasion when the cables move with the reciprocator, and the connectors can be wore down easily.

Previously, fastening device for cable connectors in lack of proportionally sealed strength to attach to the cables or fibers. The cables or fibers will be broke off when the cables or fibers being drew out again and again, especially, the fiber has inner lines for transmitting signals by reflecting light. The inner line of the fiber includes glass, quartz and material with high rigidity, therefore the inner lines are fragile.

Furthermore, an U.S. Pat. No. 5,927,892 discloses a device for fastening a cable, the device includes a lock nut 10, a washer 20, a casing 30, a collar 40, metal clamp 50, and a casing 60. The pawls 52 of the clamp 50 engage with an annular groove 42 of the collar 40 for tightly holding the cable. This fastening device has only one narrow connecting portion for fastening the cable. The cable can not be retained well-proportioned. Only one connecting portion of the pawls 52 of the clamp 50 and the annular groove 42 of the collar 40 is used for retaining the cable, and it can not prevent the vapor from getting inside commendably. The cable fastening device must conquer the two connectors of the cable for fastening the cable, and install metal hose or other similar protecting tube at the at least one of the two connectors, and also consider waterproof. Moreover, the living environment of the human being is becoming more and more worse, causing more and more flood and stormy calamity. The fastening of the cables, fibers, hose or other connectors must be provided with high capability of waterproof and wearability.

BRIEF SUMMARY

A fastening device is provided for fastening cables, fibers or wave hoses in position with multiple ways, and for waterproof capability. The fastening device includes a first casing, an inner holding part, a waterproof screw annulus, a positioning nut, a connecting casing, a second casing, an inner buckled nut, a resilient washer, and a constricting gasket. The first casing defines a through hole. A slope and an inner thread section are formed thereon. The inner holding part includes a collar and a clamp for holding the cable. The waterproof screw annulus includes a first thread section, a second thread section, a block and a slanted portion. The block is positioned between the first thread section and the second thread section. When a fastening device is assembled to a board, the block abuts against the board. So that the first thread section and the second thread section are placed at opposite sides of the board. The positioning nut includes an inner thread section and at least one positioning slot. The connecting annulus is a hollow column. A positioning annular flange is formed at one end of the connecting annulus. An outer thread section is formed at the other end thereof. An inner thread section and a slanted portion are formed on an inner side of the column. The second casing has a through hole, a slanted portion and an inner thread section. The inner buckled nut is a hollow column. The inner buckled nut has an inner wall, and the inner wall extends out to form an outer wall. A slot is defined between the inner wall and the outer wall. The resilient washer is set on the wave hose, and positioned between the second casing and the inner buckled nut. The components mentioned above are all pipe-shaped, and the section of each one is hollow. So the cable is inserted from the first casing, retaining by the inner holding part, and finally goes through the second casing. The first casing and the second casing are respectively engaged with the waterproof screw annulus and the connecting annulus. The first casing and the second casing take force to the wave hose for holding the cable or fiber in place in multiple ways, and avoid shifting or breaking off from drawing outside. The fastening device also has multi-ways for waterproof.

Further, the collar and the clamp of the inner holding part are set around the cable, and the constricting gasket is set around the cable for enhancing nondestructive force to the cable. The collar has a tapered portion, and an axial broken seem. The tapered portion abuts against the waterproof annulus. The collar is urged by the first casing for retaining the cable for the second time. The collar can be enlarged to guide in a cable with enlarged head.

Moreover, at least one positioning tab is formed on the inner surface of the slot of the inner buckled nut for holding the wave hose rapidly. The positioning tab engages with the groove of the wave hose for avoiding slippage. A constricting gasket is further set between the connecting annulus and the inner buckled nut for clamping the cable or the fiber tightly from waterproof.

The explanation of the wave hose is not restricted by the embodiment of the invention. The wave hose can be helix formed or has equal intervals, or be made from metal, plastic, rubber, or other material that are known to those of ordinary skill in the art.

According to each embodiment of the present invention, the fastening device has evenly distributed strength to retain the cable, the fiber, or the wave hose, which has two connectors, for waterproof. The fastening device can assemble the wave hose to the cable for protecting the cable. To sum up, the fastening device has multi-ways for waterproof, and high retaining capability for protecting the cable from breaking off by shifting or drawing outside to adapt to different weather conditions.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
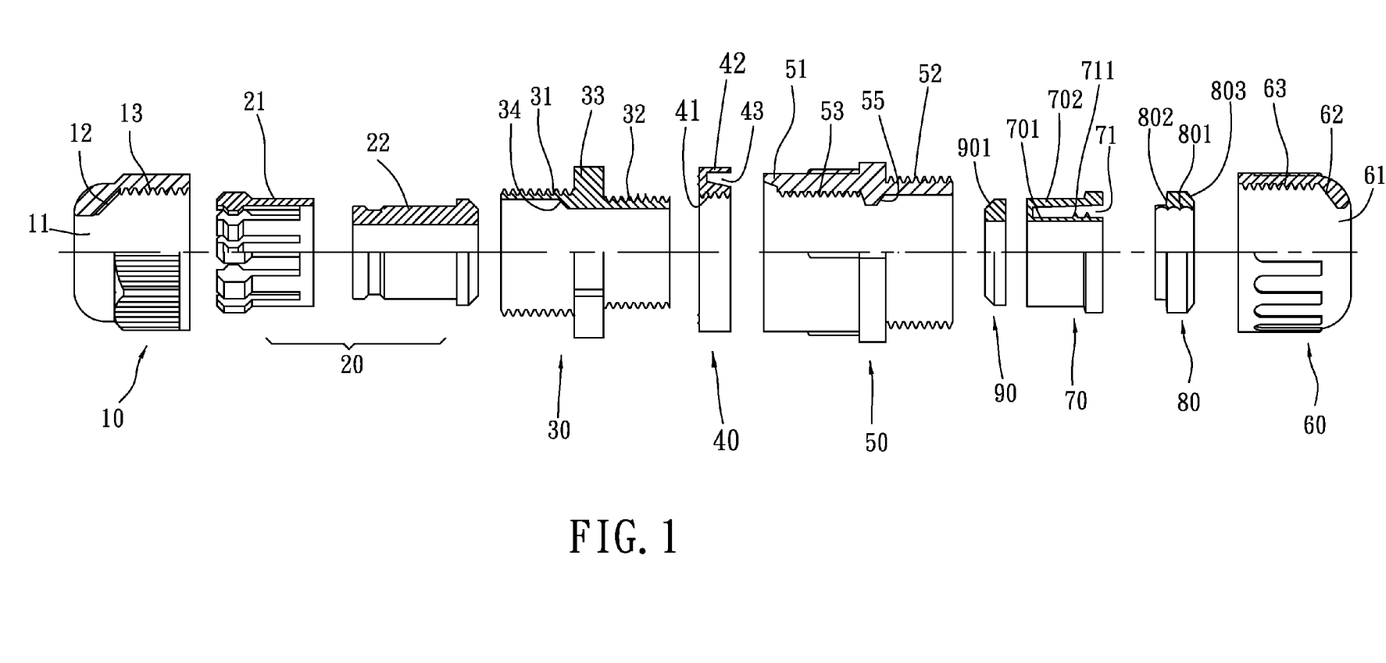
FIG. 1 is an exploded view of a fastening device of a preferred embodiment of the present invention, the fastening device including a first casing 10, an inner holding part 20, a waterproof screw annulus 30, a positioning nut 40, a connecting casing 50, a second casing 60, an inner buckled nut 70, a resilient washer 80, and a constricting gasket 90.

Referring to FIG. 1 and FIG. 1A, a fastening device includes a first casing 10, an inner holding part 20, a waterproof screw annulus 30, a positioning nut 40, a connecting annulus 50, a second casing 60, an inner buckled nut 70, a resilient washer 80 and a constricting gasket 90. The first casing 10 defines a through hole 11. A slope 12 and an inner thread section 13 are formed therein. The inner holding part 20 includes a collar 22 and a clamp 21. The inner holding part 20 locates at an inner side of the waterproof screw annulus 30 for clamping the cable L. The waterproof screw annulus 30 is a hollow column. The waterproof screw annulus 30 includes a first thread section 31, a second thread section 32, a block 33 and a slanted portion 34. The slanted portion 34 locates at an inner side of the first thread section 31. The block 33 is positioned between the first thread section 31 and the second thread section 32. The first thread section 31 can engage with the inner thread section 13 of the first casing 10.

Figures 3, 3A:
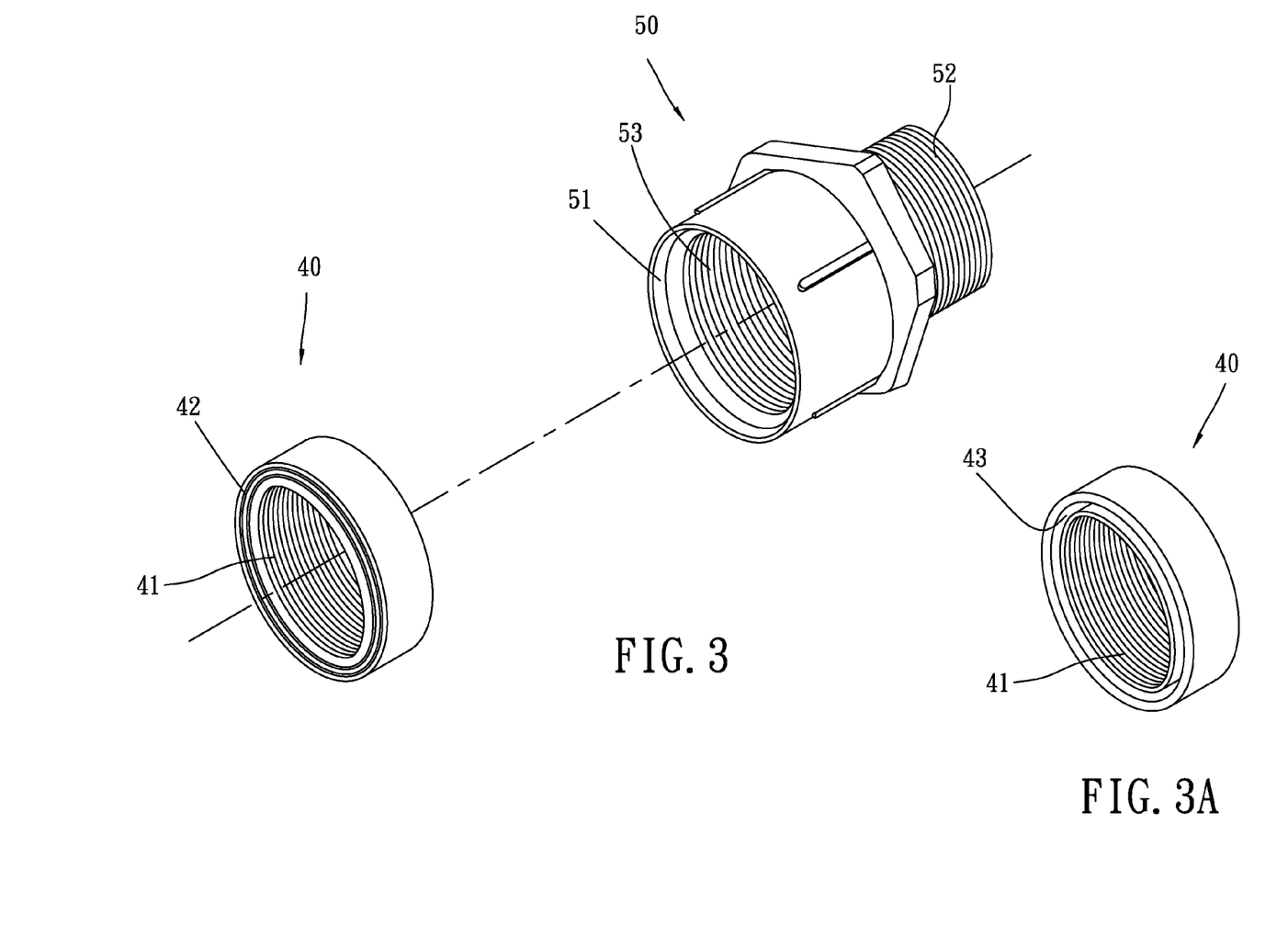
FIG. 3 is an exploded, isometric view of the positioning nut 40 and the connecting casing 50 of FIG. 1.
FIG. 3A is an isometric view of the positioning nut 40 of FIG. 1.

The positioning nut 40 includes an inner thread section 41, a positioning slot 43, and at least one waterproof flange 42 (referring to FIG. 3 and FIG. 3A). The waterproof flange is configured for an annular shape, and positioned at an axial surface of the positioning nut 40. The positioning slot 43 is annular wedge-shaped slot. The connecting annulus 50 is a hollow column. The connecting annulus 50 has a positioning annular flange 51 at one end thereof, an outer thread section 52 at the other end thereof, and an inner thread section 53 therein. The positioning annular flange 51 has a taper-shaped section for facilitating engaging with the positioning slot 43 of the positioning nut 40. The positioning slot 43 mates with the positioning annular flange 51 to form a sealed waterproof assembly, and the inner thread section 53 and the inner thread section 41 of the positioning nut 40 engage with the second thread section 32 of the waterproof annulus 30 tightly. The second casing 60 defines a through hole 61 therein, and has a slanted portion 62 and an inner thread section 63. The inner buckled nut 70 is a hollow column. The inner buckled nut 70 has an inner wall 701. One end of the inner wall 701 extends out to form an outer wall 702 which parallels to the inner wall 701. A slot 71 is defined between the inner wall 701 and the outer wall 702 for receiving a wave hose. The inner wall 701 is resilient. At least one positioning tab 711 is formed at one side of the inner wall 701. The positioning tab 711 is used for resiliently retaining the wave hose from an inner side thereof. The resilient washer 80 has an inner wave surface 801, and a slanted portion 802. The resilient washer 80 is positioned inside the second casing 60, and sandwiched between the second casing 60 and one end of the inner buckled nut 70 for engaging with the wave hose S.

Further, a constricting gasket 90 is provided between the connecting annulus 50 and the inner buckled nut 70. The constricting gasket 90 has a slanted portion 901. The constricting gasket 90 is used for retaining one end of the cable and provides waterproofness.

The block 33 of the waterproof screw annulus 30 has a washer attached thereon. The washer 301 has at least one waterproof flange 3011 on an axial surface formed thereon for preventing seeping in the vapor directly.

Figure 11:
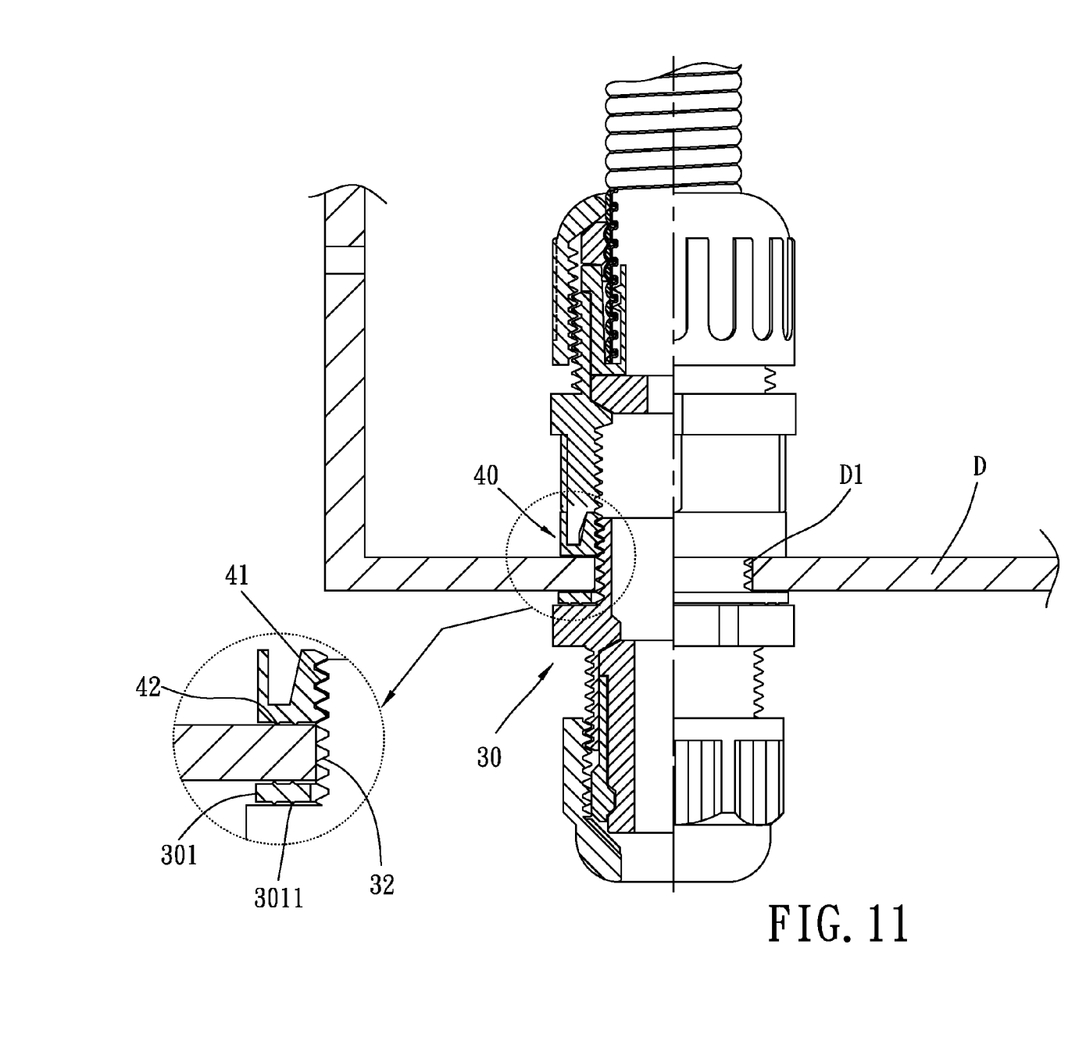
FIG. 11 is a partial sectional view of fourth embodiment of the present invention of the fastening device, which the fastening device is copulated to an L-shaped board.

Referring also to FIG. 11, a board D is set between the waterproof screw 30 and the positioning annulus 40. The board D may be L-shaped or T-shaped (not shown in drawings). The board D has an insert hole D1 defined therein for receiving the second thread section 32 of the waterproof screw annulus 30. The waterproof flange 42 of the positioning nut 40 contacts with the board D, and is forced to attach thereto to form a waterproof layer with proper deformation. The fastening device can be adjusted to any proper angles for preventing the connector of the cable C from breaking off by the stress. Moreover, the washer 301 is set between the block 33 of the waterproof screw annulus 30 and the board D. The at least one waterproof flange 3011 of the waterproof screw annulus 30 not only prevent seeping water from the insert hole D1, but also enhance the attachment between the fastening device and the board D.

Furthermore, a positioning annulus 54 is set inside the connecting annulus 50. The positioning annulus 54 is a hollow column. The positioning annulus 54 has larger diameter at one end thereof for abutting onto the inner side of the connecting annulus 50, so the positioning annulus 54 can receive a frail cable, such as a fiber cable, therethrough, and hold the fiber cable firmly for preventing from breaking off. The material of the positioning annulus 54 can select from resilient rubber or plastic.

Figure 2A:
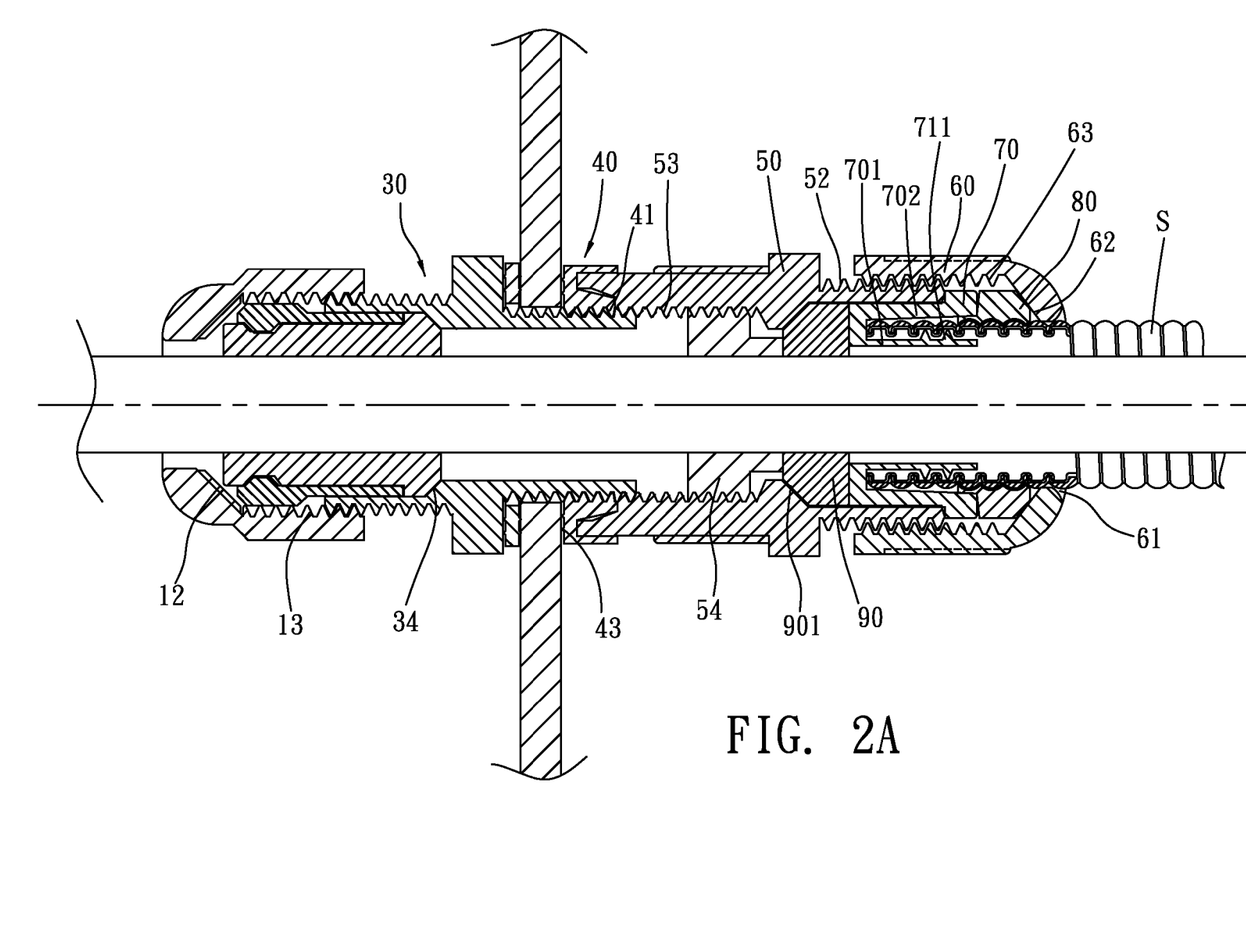
FIG. 2A is an assembled view in section of the fastening device of FIG. 1.
Figure 2B:
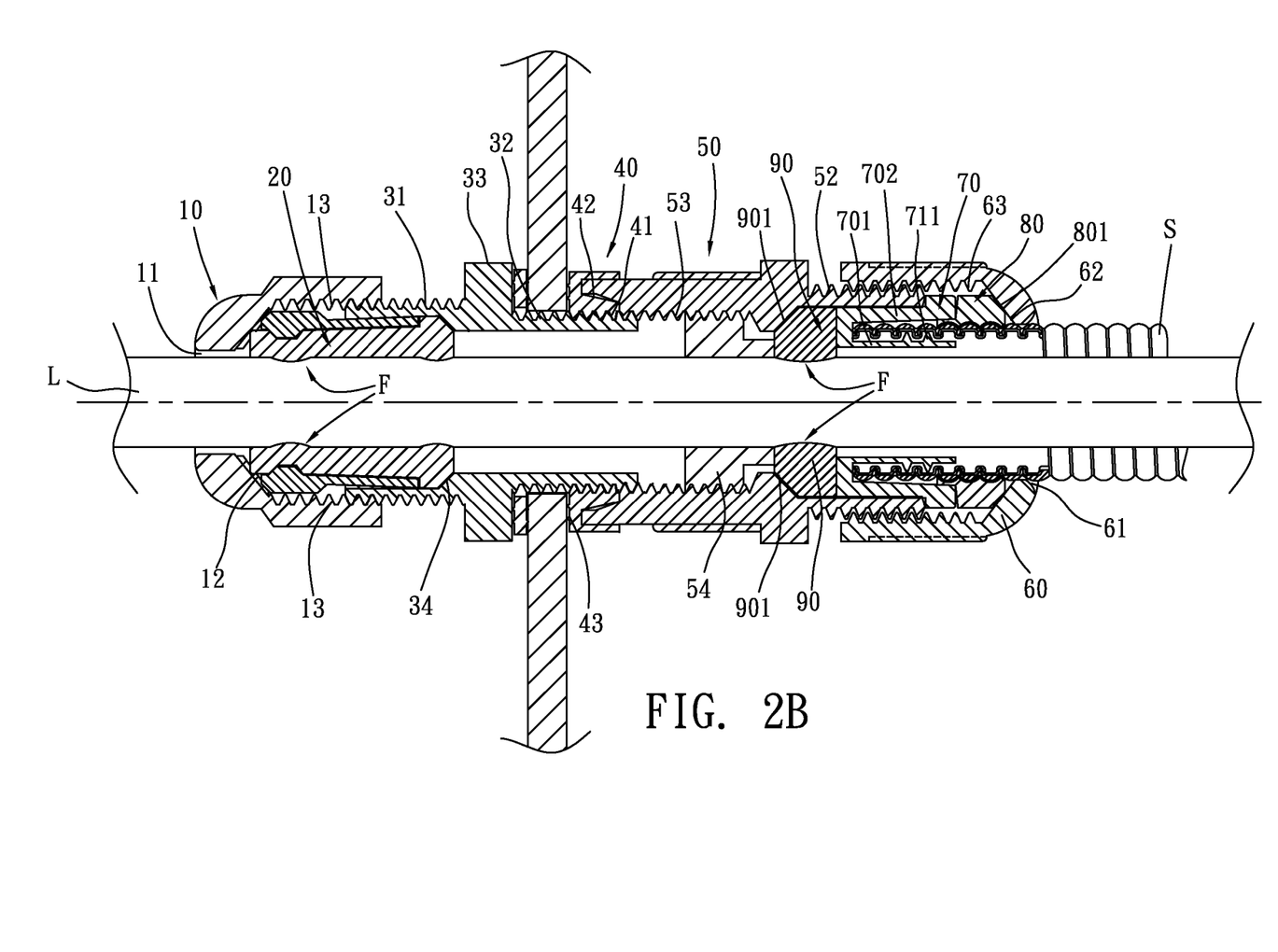
FIG. 2B is another assembled view in section of FIG. 2.

Referring also to FIG. 2B, the cable L is inserted into the through hole 11 of the first casing 10, and goes through the inner holding part 20, the waterproof screw annulus 30, the positioning nut 40, the connecting annulus 50, and the constricting gasket 90, and passes through the inner buckled nut 70 and the resilient washer 80, and out of the through hole 61 of the second casing by sequence. The first casing 10 engages with the first thread section 31 of the waterproof screw annulus 30, and abuts against the inner holding part 20 to generate force F to retain the cable L tightly at one retaining portion. The second thread section 32 of the waterproof annulus 30 engages with the positioning nut 40 and the connecting annulus 50. At the same time, the metal hose (wave hose) S is inserted into the through hole 61 of the second casing 60, the resilient washer 80, and the inner buckled nut 70. The metal hose S is hold by the inner buckled nut 70. Then the second casing 60 is engaged with the outer thread section 52 of the connecting annulus 50. The slanted portion 802 of the resilient washer 80 is urged by the slanted portion 62 of the second casing 60 to retain the metal hose tightly. The slanted portion 901 of the constricting gasket 90 is urged by a slanted portion 55 of the connecting annulus 50 to deform inward, generating force F to retain the cable at another retaining portion.

Figure 4:
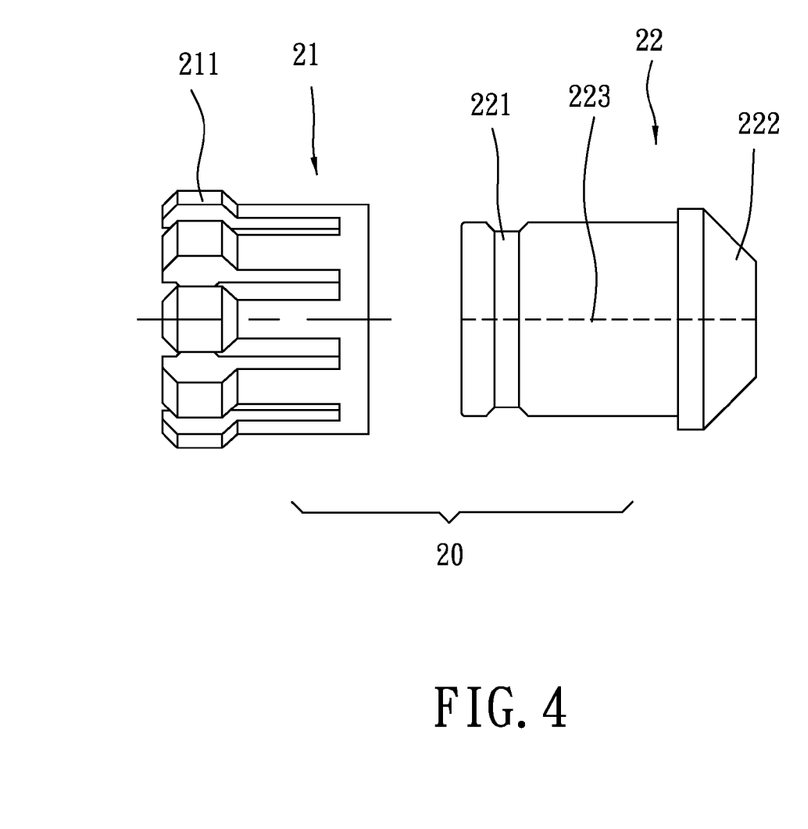
FIG. 4 is an exploded view of the inner holding part 20 of FIG. 1.
Figures 5A, 5B, 5C:
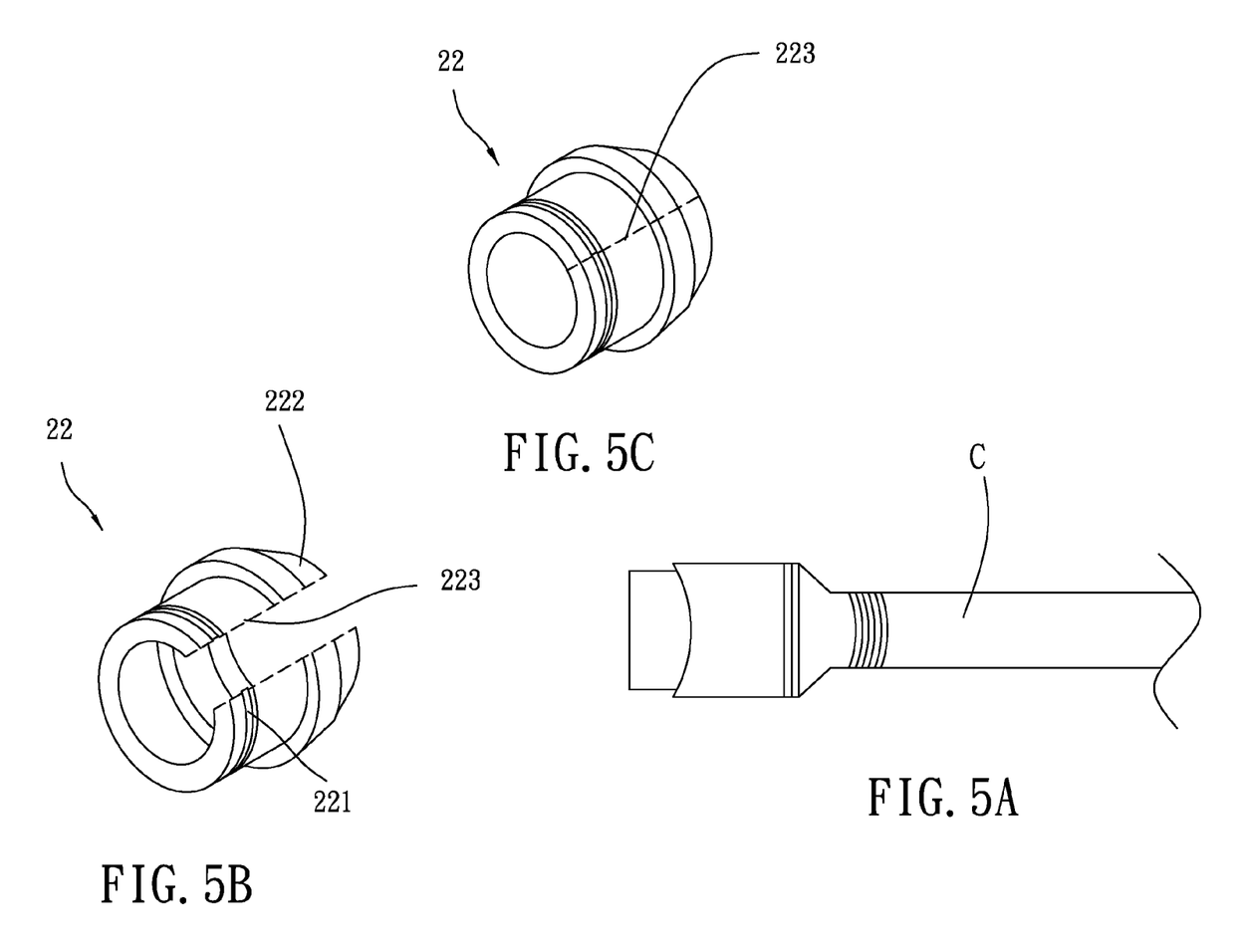
FIG. 5A is a front view of a connector of the present invention.
FIG. 5B is an isometric view of a collar 22 of the inner holding part 20.
FIG. 5C is a partial sectional view of the collar 22 of FIG. 5B.

Furthermore, referring also to FIG. 4, the inner holding part 20 includes a collar 22 and a clamp 21. The collar 22 is a hollow column, and is made from resilient material. The collar 22 includes a neck portion 221, a tapered portion 222, and a broken seam 223. The neck portion 221 is defined in one end of the collar 22, and has annular dent. The tapered portion 222 is formed at the other end of the collar 22, and to be shaped as a hollow cone. The collar 22 can be enlarged by a cable C having a large head (see FIGS. 5A to 5C), and facilitates the cable C to get through. The clamp 21 has a plurality of pawls 211 to clamp to the neck portion 221 of the collar 22. The cable can not store the stress drew by outer force as a result of the resilient column collar 211. Further, the tapered portion 222 of the collar 22 abuts on the slanted portion 34 of the waterproof screw annulus 30 (referring also to FIG. 2B). The collar 22 is urged by the first casing 10 to hold the cable tightly and form another waterproof layer. The preferred embodiment of the invention gives better efficacy on retaining the cable and waterproof than the prior art.

Figure 6:
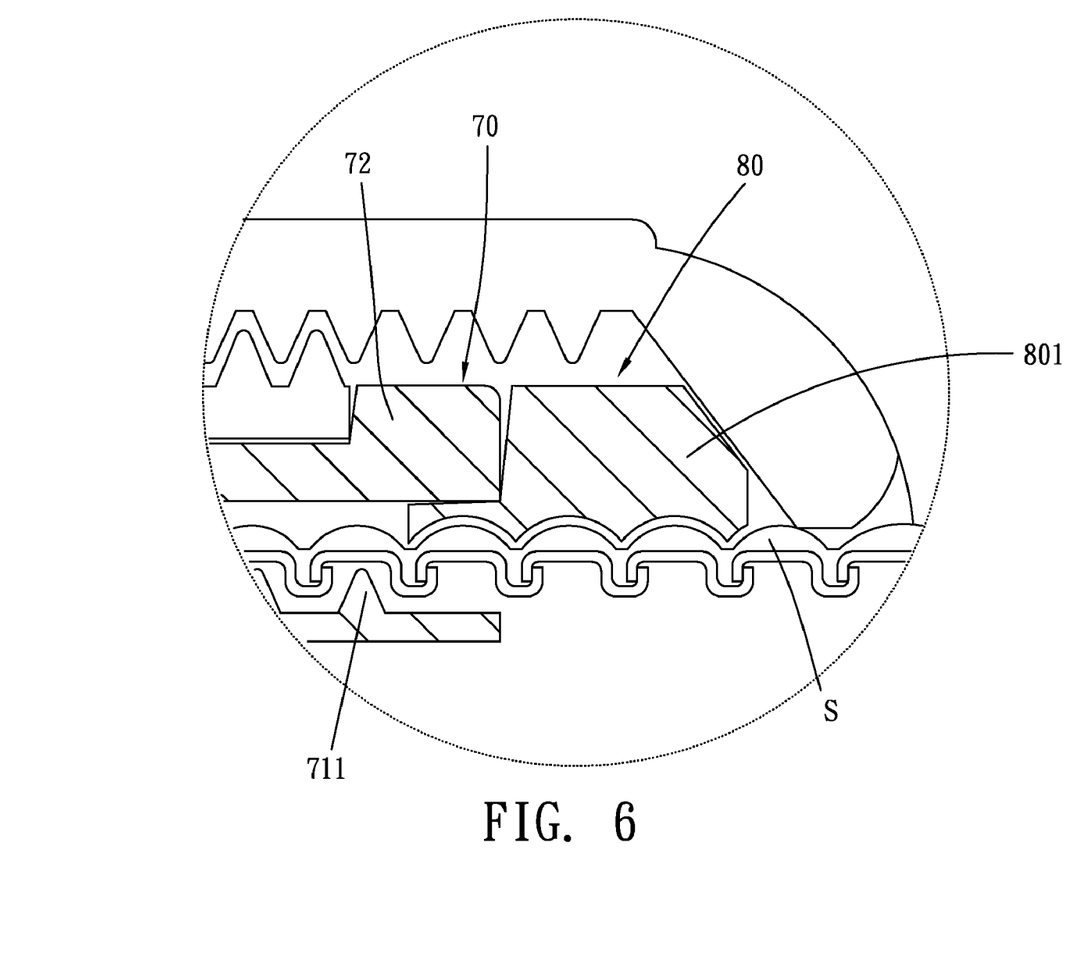
FIG. 6 is a partial enlarge view of the inner buckled nut 70 and resilient washer 80 of FIG. 2.

Referring also to FIG. 6, the at least one positioning tab 711 is formed at an inner wall of the slot 71. Each positioning tab 71 extends into an inner groove of the outer wave hose for blocking the wave hose from moving out. The resilient washer 80 has wave-shaped structure 801 in the inner surface for fitting the wave hose. The wave-shaped structure 801 extends into the inner buckled nut 70 for further sealing. The wave-shaped structure 801 cooperates the at least one positioning tab 711 to tightly retain the wave hose S from shifting outside, and provide waterproof.

Figure 7A:
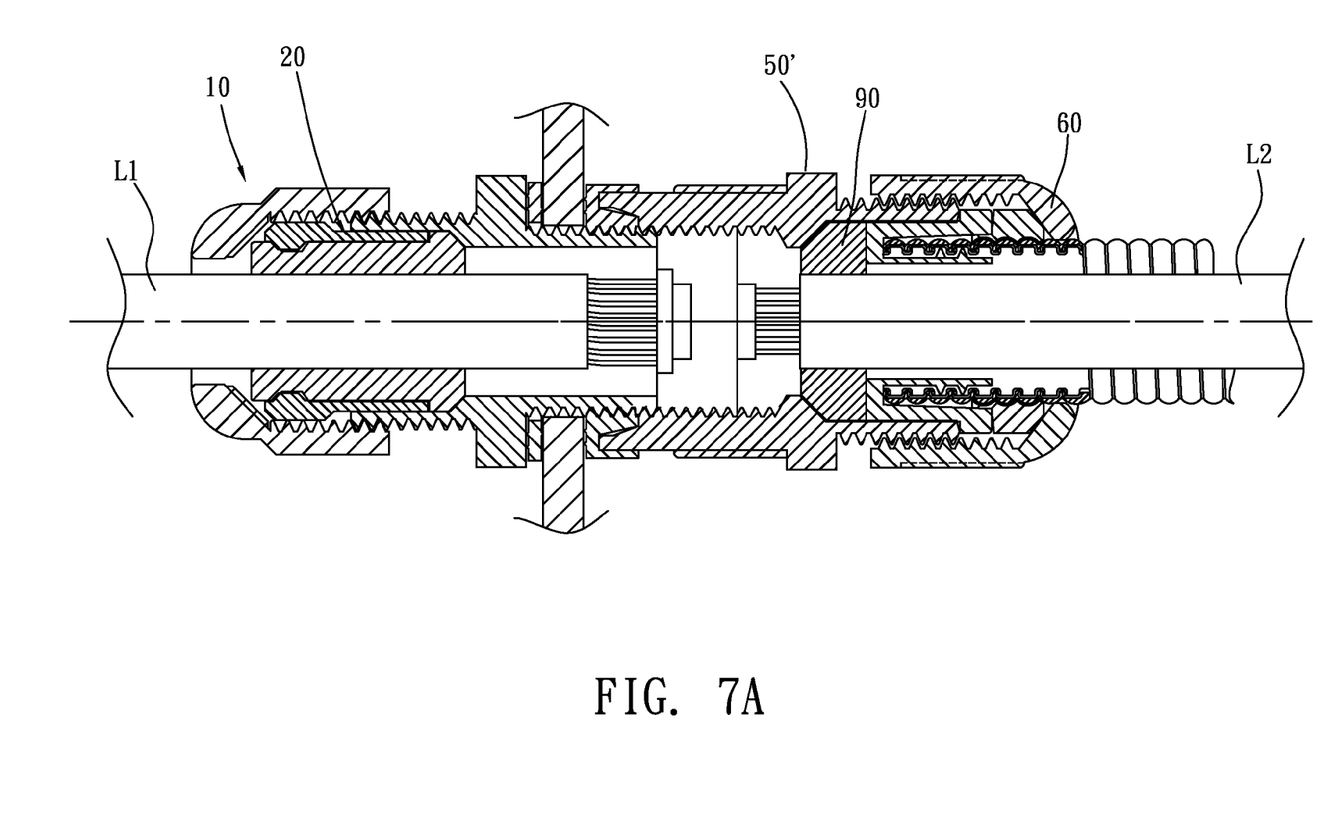
FIGS. 7A, 7B, 8A, 8B are instructional view of the cables L1, L2 and the connectors C1, C2 fastened by the fastening device.

Referring also to FIG. 7A, the preferred embodiment of the invention can also protects connectors of a cable L1 and cable L2. A waterproof screw annulus 50' has extended body for receiving the connectors of the cable L1 and cable L2 to provide waterproof and shift prevention.

Figure 7B:
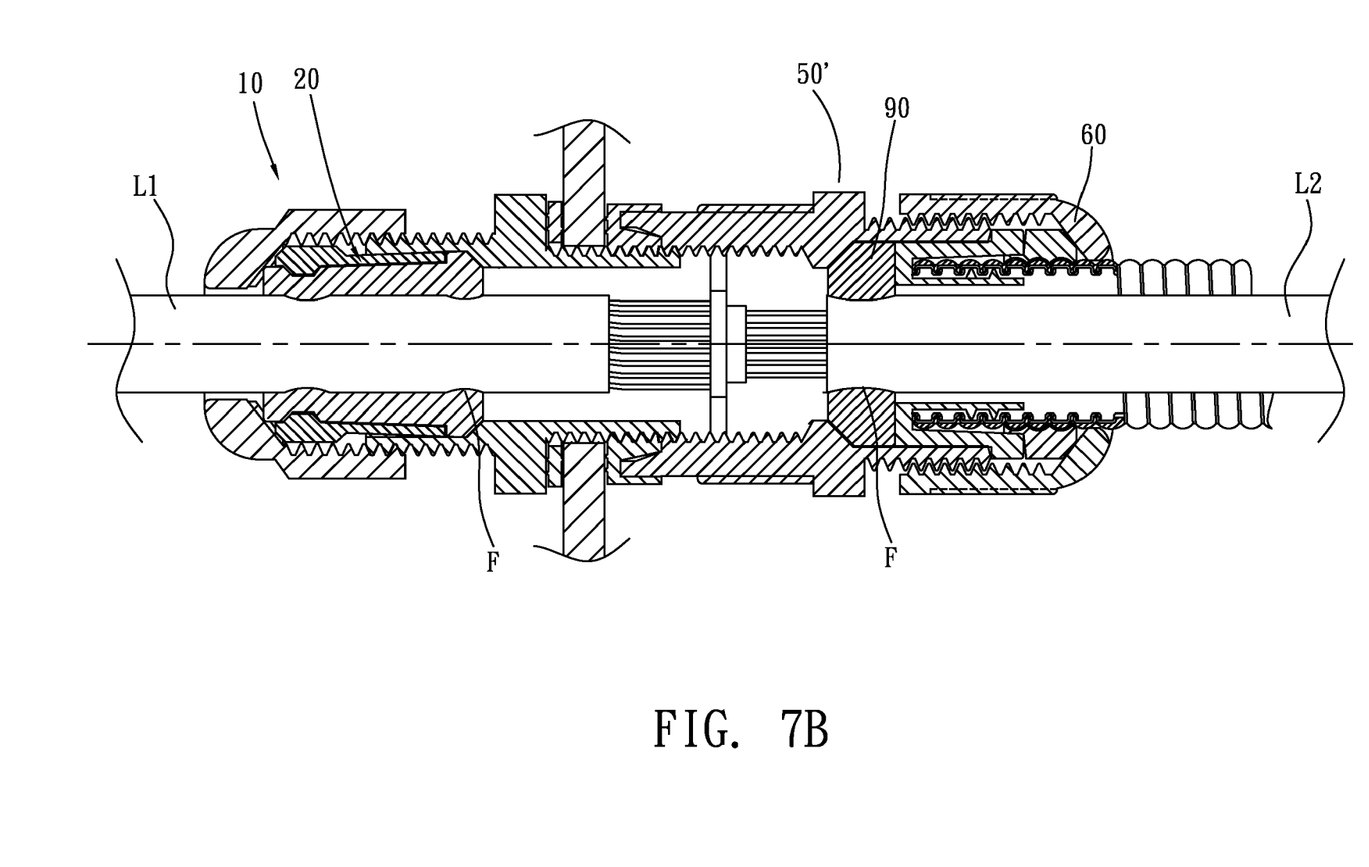
Figure 8A:
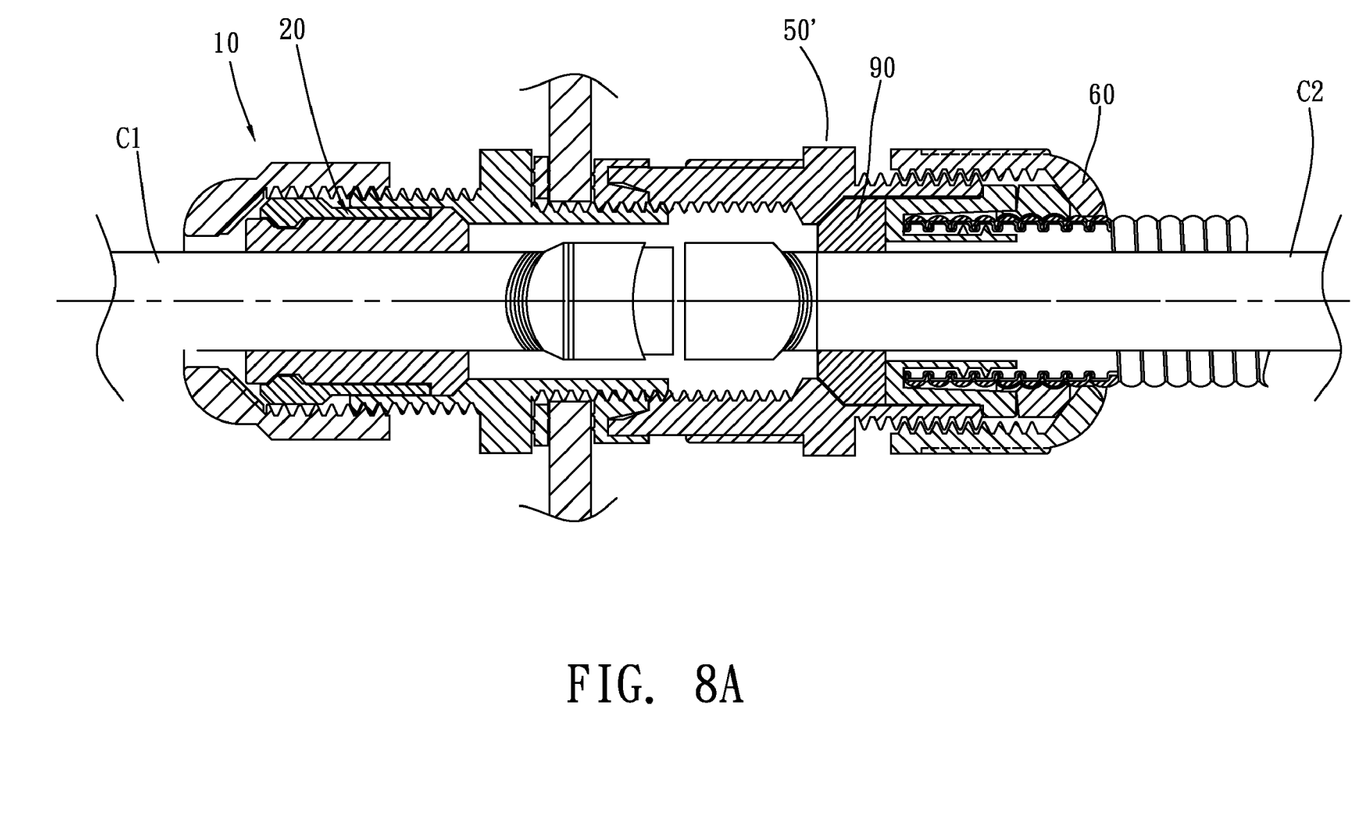
Figure 8B:
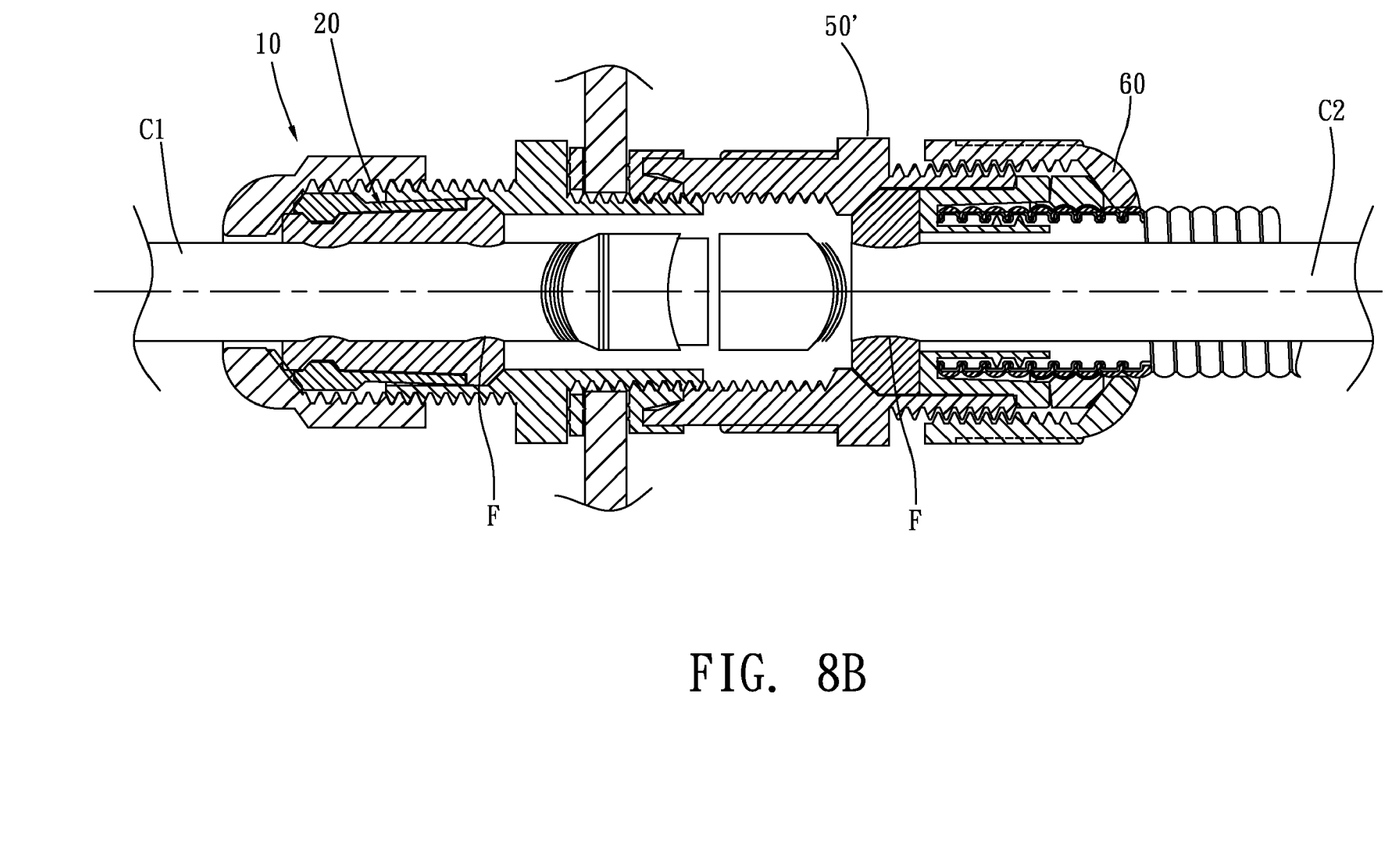

Referring also to FIGS. 7A, 7B, 8A, 8B, and FIG. 4, the fastening device also can be inserted into cable connectors C1 and C2 having larger heads (FIG. 7A and FIG. 7B). The connecting annulus 50' has extended body for receiving the cable connectors C1 and C2. Furthermore, when the inner holding part 20 is urged by the first casing 10 and the constricting gasket 90 is urged by the second casing, the cables are retained by the forces F. So that the cables has waterproof and shift prevention at two retaining portions thereof.

Figure 9:
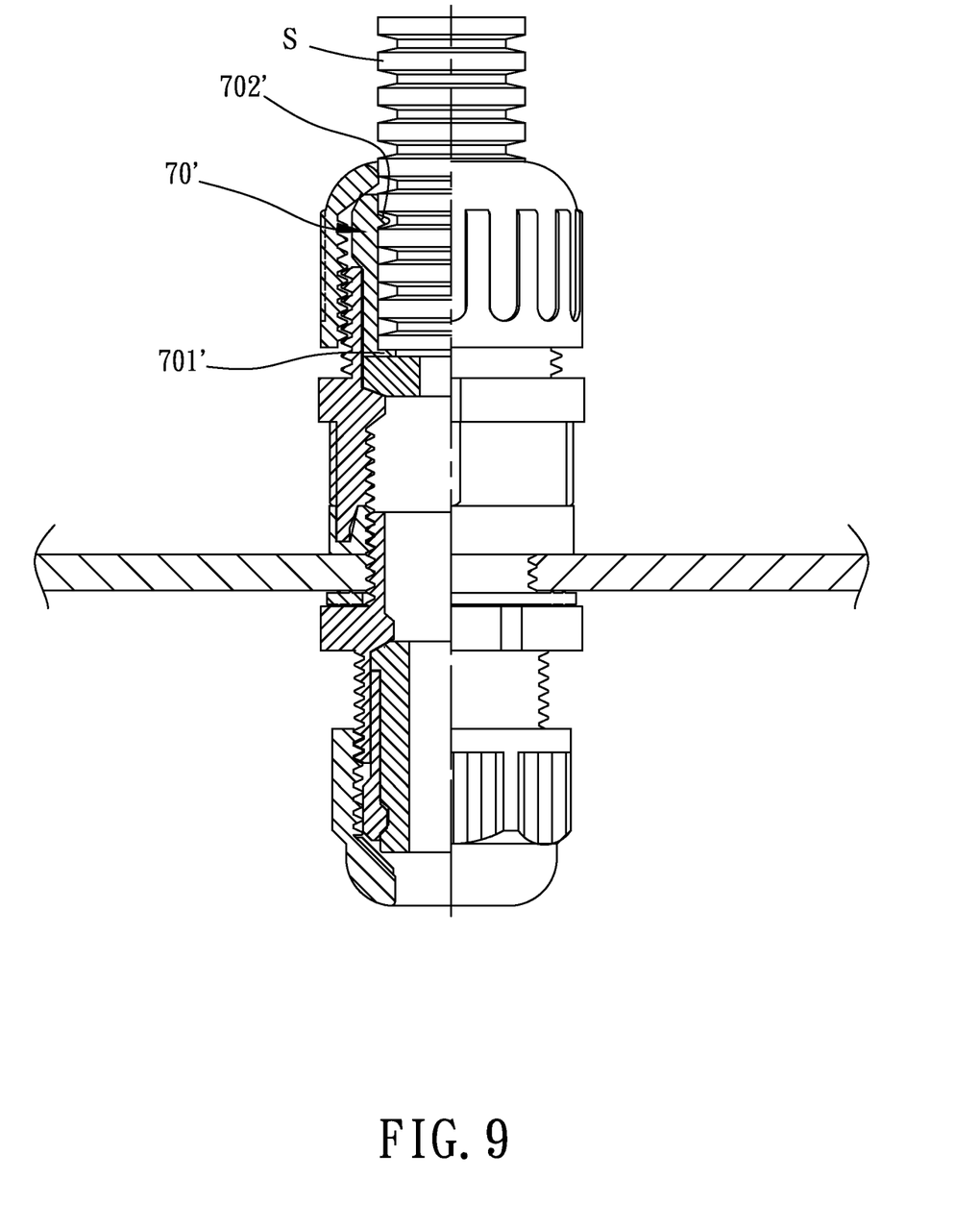
FIG. 9 is a partial sectional view of a second embodiment of the present invention of the fastening device.

Referring also to FIG. 9, showing a second embodiment of the invention, the wave hose S has equal intervals. The inner buckled nut 70 and the resilient washer 80 in the preferred embodiment of this invention are replaced by an inner buckled nut 70'. The inner buckled nut 70' is pipe-shaped. An annular stopper 701' extends from one end of the inner buckled nut 70' is used for abutting against a front end of the wave hose S. At least one tab 702' is formed inside the inner buckled nut 70' for buckling and retaining the wave hose S.

Figure 10:
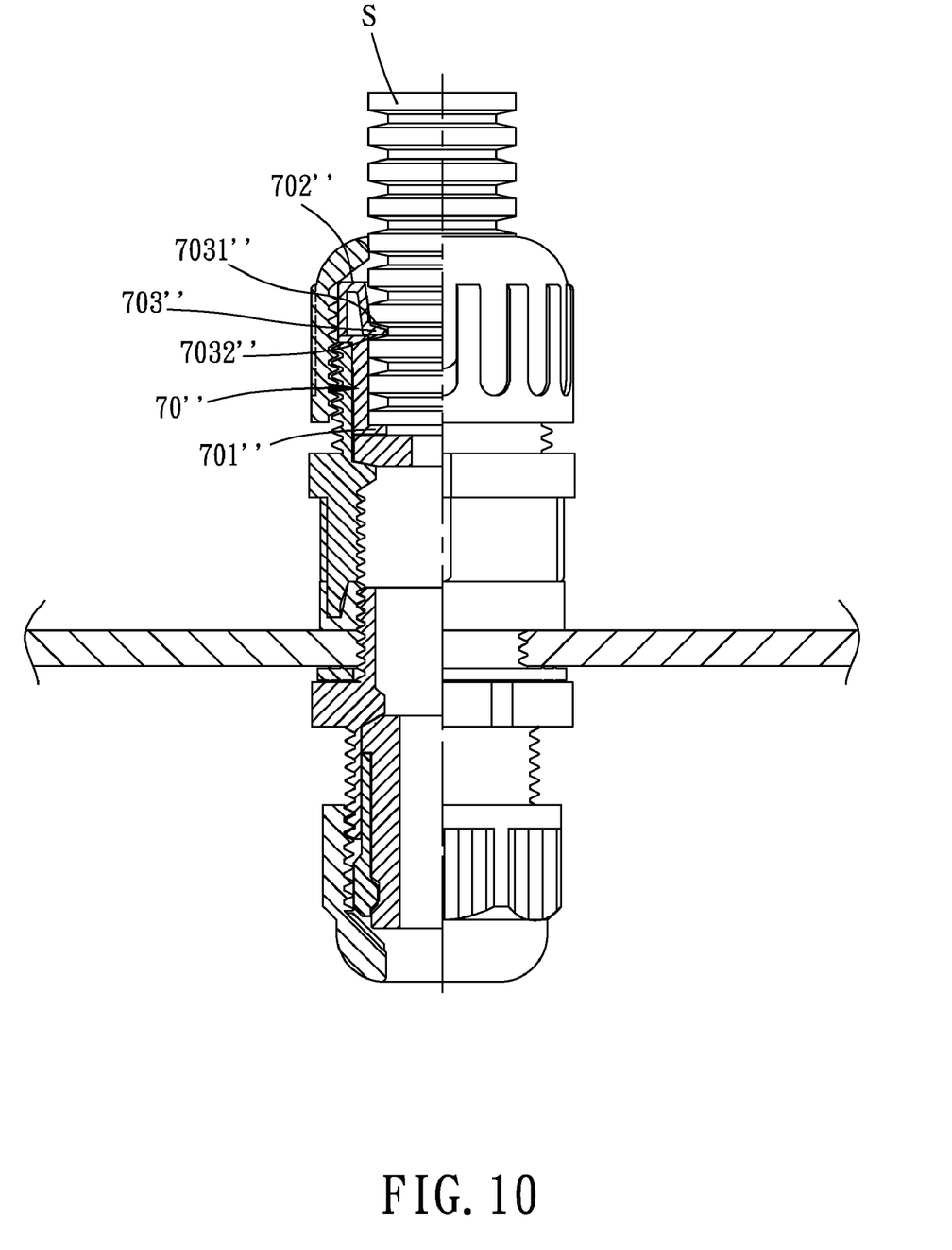
FIG. 10 is a partial sectional view of a third embodiment of the present invention of the fastening device.

Referring also to FIG. 10, showing a third embodiment of this invention, the inner buckled nut 70 and the resilient washer 80 in the preferred embodiment of the invention, or the inner buckled nut 70' at the second embodiment of the invention, are replaced by an inner buckled nut 70". The inner buckled nut 70" is pipe-shaped. An annular stopper 701" extends from one end of the inner buckled nut 70" is used for abutting against a front end of the wave hose S. An "n"-shaped retaining member 702" is formed on the other end of the buckled nut 70". An annular tab 703" is formed on the retaining member 702" for buckling the wave hose S at the groove thereof. The retaining member 702" can resiliently deform inward slightly. The annular tab 703" has a slanted surface 7031" at an outer side thereof, and a vertical surface 7032" at an inner side thereof. When the wave hose S is rotated in, the wave hose S rides over the slanted surface 7031", and the annular tab 703" resiliently deforms back and abuts against the wave hose S. Contrarily, when the wave hose S is drew backwards, the vertical surface 7032" blocks on the groove of the wave hose S for buckling and retaining the cable connector.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A fastening device for fastening cables and wave hoses, comprising:

a first casing, comprising a first through hole, a slope first and a first inner thread section;

an inner holding part located inside the first casing for clamping a cable;

a waterproof screw annulus being a hollow column, comprising a first thread section, a second thread section, a block and a first slanted portion, the block positioned between the first thread section and the second thread section, the first slanted portion positioned in the inner side of the first thread section, and the inner holding part located inside the waterproof screw annulus, the first casing engaging with the first thread section;

a positioning nut comprising an inner thread portion and at least one positioning slot being an annular wedge-shaped slot, the inner thread section of the positioning nut engaging with the second thread section of the screw annulus;

a connecting annulus being a hollow column, one end of the connecting annulus having a positioning annular flange having a taper-shaped section for engaging with the positioning slot such that the positioning slot mates with the positioning annular flange to form a sealed waterproof assembly, the other end of the connecting annulus having an outer thread section, a second inner thread section and a second slanted portion formed on an inner side of the connecting annulus, the inner thread section of the connecting annulus engaging with the second thread section of the screw annulus;

an inner buckled nut being a hollow column, the inner buckled nut having an inner wall being resilient, one end of the inner wall extending out to form an outer wall which parallels the inner wall, a slot defined between the inner wall and the outer wall, at least one positioning tab formed at one side of the inner wall for resiliently retaining a wave hose, the inner buckled nut being located inside the connecting annulus;

a second casing, comprising a second through hole, a second slope and a third inner thread section; and a resilient washer, having an inner wave surface and a third slanted portion, positioned inside the second casing, and sandwiched between the second casing and one end of the inner buckled nut for engaging with the wave hose.

2. The fastening device as claimed in claim 1, wherein the inner holding part comprises:

a collar configured for a hollow column, the collar having a neck portion, a tapered portion, and further defining a broken seam; and a clamp comprising a plurality of pawls for clamping the neck portion of the collar; wherein the tapered portion abuts on the slanted portion of the waterproof screw annulus, another waterproof layer is formed by the collar gripping the cable tightly which is forced by the waterproof screw annulus on the tapered portion thereof and the first casing on the other side of collar.

3. The fastening device as claimed in claim 1, wherein the fastening device further comprising a constricting gasket which is positioned in the connecting annulus, and has a slanted portion.

4. The fastening device as claimed in claim 1, wherein the waterproof screw annulus has a washer thereon, and the washer has at least one waterproof flange at axial surface thereof.

5. The fastening device as claimed in claim 1, wherein the positioning nut further comprises a waterproof flange, and the waterproof flange is an annular flange and is formed on axial surface of the positioning nut.

6. The fastening device as claimed in claim 1, wherein the fastening device further comprises a board, and a perforation is defined in the board.

7. The fastening device as claimed in claim 1, wherein the fastening device further comprises a positioning annulus, the positioning annulus is a hollow column with a larger diameter at one end thereof, and the positioning annulus fastens the cables or hoses therein.

* * * * *